USO11376462B2

United States Patent
Chen

(10) Patent No.: US 11,376,462 B2
(45) Date of Patent: Jul. 5, 2022

(54) INTERNAL MAGNETIC RESISTANCE SYSTEM FOR USE WITH FITNESS DEVICE

(71) Applicant: CHANG YOW TECHNOLOGIES INTERNATIONAL CO., LTD., Taichung (TW)

(72) Inventor: Chao-Chuan Chen, Taichung (TW)

(73) Assignee: CHANG YOW TECHNOLOGIES INTERNATIONAL CO., LTD., Taichung (TW)

( * ) Notice: Subject to any disclaimer, the term of this patent is extended or adjusted under 35 U.S.C. 154(b) by 578 days.

(21) Appl. No.: 16/523,185

(22) Filed: Jul. 26, 2019

(65) Prior Publication Data

US 2020/0398097 A1 Dec. 24, 2020

(30) Foreign Application Priority Data

Jun. 20, 2019 (TW) .................................. 108121530

(51) Int. Cl.
| | | |
|---|---|---|
| *A63B 21/005* | (2006.01) | |
| *H02K 1/18* | (2006.01) | |
| *H02K 49/04* | (2006.01) | |
| *A63B 22/06* | (2006.01) | |

(52) U.S. Cl.
CPC ......... *A63B 21/0052* (2013.01); *H02K 1/187* (2013.01); *H02K 49/043* (2013.01); *A63B 22/06* (2013.01)

(58) Field of Classification Search
CPC ... A63B 21/0052; A63B 21/225; A63B 22/06; A63B 22/0605; H02K 1/187; H02K 49/043; H02K 7/02; H02K 7/14; Y02E 60/16
See application file for complete search history.

(56) References Cited

U.S. PATENT DOCUMENTS

| | | | | |
|---|---|---|---|---|
| 5,711,404 A | * | 1/1998 | Lee ...................... | H02K 49/043 188/164 |
| 7,481,749 B1 | * | 1/2009 | Chen ..................... | A63B 21/225 482/64 |
| 10,987,540 B2 | * | 4/2021 | Chen .................... | A63B 21/0058 |
| 2009/0173183 A1 | * | 7/2009 | Chen ..................... | F16F 15/30 74/572.21 |

FOREIGN PATENT DOCUMENTS

GB 2454487 A * 5/2009 .......... A63B 21/005

\* cited by examiner

*Primary Examiner* — Naishadh N Desai
(74) *Attorney, Agent, or Firm* — Muncy, Geissler, Olds & Lowe, P.C.

(57) ABSTRACT

An internal magnetic resistance system for use with a fitness device includes an axle, inertia wheel, transmission wheel, magnetic permeable ring and electromagnet. The inertia wheel is disposed at the axle and has a protruding ring portion. The transmission wheel connects to the inertia wheel and transfers an external force to the inertia wheel to cause the inertia wheel to rotate. An outer circumferential surface of the magnetic permeable ring is fixedly disposed on an inner circumferential surface of the protruding ring portion such that the magnetic permeable ring rotates together with the inertia wheel. The electromagnet is disposed in the protruding ring portion and surrounded by the magnetic permeable ring. The electromagnet has a support fixedly disposed at the axle and iron cores disposed at the support. Each said iron core is surrounded by a coil and separated from the magnetic permeable ring by a gap.

7 Claims, 9 Drawing Sheets

INTERNAL MAGNETIC RESISTANCE SYSTEM FOR USE WITH FITNESS DEVICE

BACKGROUND OF THE INVENTION

1. Field of the Invention

The present disclosure relates to fitness devices and, more particularly, to an internal magnetic resistance system for use with a fitness device.

2. Description of the Related Art

Conventional fitness devices (such as body-building bikes and elliptical trainers) are each equipped with a resistance system whereby users exert different degrees of resistance forces on a flywheel or any similar component, allowing the users to adjust the ease of operation according to the users' training needs and thus attain the benefits of fitness training.

The resistance system is generally of three types: frictional, external magnetic and internal magnetic. The conventional frictional resistance system includes a brake rod and a friction patch. The friction path is made of cattle hide or wool quilt and adhered to the outer circumferential surface of the flywheel to generate resistance. The resistance strength of the conventional frictional resistance system is proportional to the downward force exerted by the friction patch. However, the conventional frictional resistance system has a drawback: accuracy and stability of resistance adjustment is bad. The conventional external magnetic resistance system operates in conjunction with a power source (such as a combination of a motor, gears and links) which drives magnets positioned proximate to the outer circumferential surface of the flywheel. The flywheel is separated from each magnet by an appropriate gap such that the flywheel rotates and thus divides the magnetic field, thereby generating resistance. The resistance strength of the conventional external magnetic resistance system is directly proportional to the area of a portion the flywheel (the magnets are positioned proximate to the portion of the flywheel.) This leads to another drawback: resistance performance of the magnets depends on the precision of mounting the resistance system in place, not to mention that accuracy and stability of resistance adjustment is bad. Regarding the conventional internal magnetic resistance system, steel cables drive the magnets toward the inner circumferential surface of the flywheel, and the magnets are separated from the flywheel by an appropriate gap, causing the flywheel to rotate and divide the magnetic field so as to generate resistance. However, the tolerance of the length of the steel cables affects the resistance performance of the magnets, not to mention that accuracy and stability of resistance adjustment is bad.

SUMMARY OF THE INVENTION

It is an objective of the present disclosure to provide an internal magnetic resistance system for use with a fitness device, and the internal magnetic resistance system steadily provides different degrees of resistance.

In order to achieve the above and other objectives, the present disclosure provides an internal magnetic resistance system comprising an axle, an inertia wheel, a transmission wheel, a magnetic permeable ring and an electromagnet. The inertia wheel is coaxially rotatably disposed at the axle. A lateral surface of the inertia wheel has a protruding ring portion. The transmission wheel is rotatably disposed at the axle and connected to another lateral surface of the inertia wheel, and the another lateral surface of the inertia wheel faces away from the protruding ring portion, thereby allowing the transmission wheel to rotate under an external force and thus drive the inertia wheel to rotate together with the transmission wheel. An outer circumferential surface of the magnetic permeable ring is fixedly disposed on an inner circumferential surface of the protruding ring portion of the inertia wheel such that the magnetic permeable ring rotates together with the inertia wheel. The electromagnet is disposed in the protruding ring portion of the inertia wheel and surrounded by the magnetic permeable ring. The electromagnet has a support fixedly disposed at the axle, iron cores spaced apart and disposed at the support, and coils winding around the iron cores, respectively. Each iron core is separated from an inner circumferential surface of the magnetic permeable ring by a gap.

Therefore, according to the present disclosure, the internal magnetic resistance system enables a stable gap to be maintained between an inner circumferential surface of the magnetic permeable ring and the iron cores. The magnetic permeable ring rotates together with the inertia wheel and thereby divides the magnetic field generated around the iron cores; hence, magnitude of the current passing through the coils and thereby adjust the strength of the magnetic field, allowing the electromagnet to steadily exert different degrees of resistance forces on the inertia wheel.

Preferably, the inertia wheel has a first axial portion. At least one first bearing is disposed between the axle and the first axial portion of the inertia wheel such that the inertia wheel rotates relative to the axle because of the first bearing. Furthermore, one end of the transmission wheel has a second axial portion. The second axial portion is coaxially disposed in the first axial portion of the inertia wheel. The other end of the transmission wheel has a bearing chamber. The bearing chamber has therein a second bearing. The transmission wheel rotates relative to the axle because of the second bearing. The second bearing is not exposed from the bearing chamber and thus is unlikely to get damaged under an external force.

Preferably, a bushing is disposed between the transmission wheel and the axle and adapted to augment stability and smoothness of operation of the transmission wheel.

Preferably, a right limiting ring is disposed at the right end of the axle and abuts against an outer end surface of the second bearing to maintain the structural stability of the second bearing.

Preferably, the support is connected to a fixing board. The fixing board has a third axial portion. The third axial portion of the fixing board and the axle are fixed together by a flat key to prevent the electromagnet from rotating together with the axle.

Preferably, a left limiting ring is disposed at the left end of the axle and abuts against an outer end surface of the third axial portion of the fixing board to maintain the structural stability of the electromagnet.

Preferably, a sleeve is disposed at the left end of the axle. The sleeve has a radial opening. One end of an adjustment screw is disposed at the radial opening. The adjustment screw has a first adjustment nut and a second adjustment nut. The first adjustment nut and the second adjustment nut face away from each other. A stationary spacer is disposed between the first adjustment nut and the second adjustment nut. The adjustment screw is disposed at the spacer. Hence, if the first adjustment nut is rotated, an end of the adjustment screw will push the axle such that the axle will move backward together with the other components. If the second adjustment nut is rotated, the adjustment screw will move away from the axle such that the axle will move forward and backward together with the other components. Therefore, the internal magnetic resistance system 18 mounted in place can be fine-tuned.

Fine structures, features, assembly or operation of the internal magnetic resistance system for use with a fitness device according to the present disclosure are illustrated by embodiments and described below. However, persons skilled in the art understand that the description below and the specific embodiments are illustrative of the present disclosure rather than restrictive of the claims of the present disclosure.

DETAILED DESCRIPTION OF THE INVENTION

Figure 1:
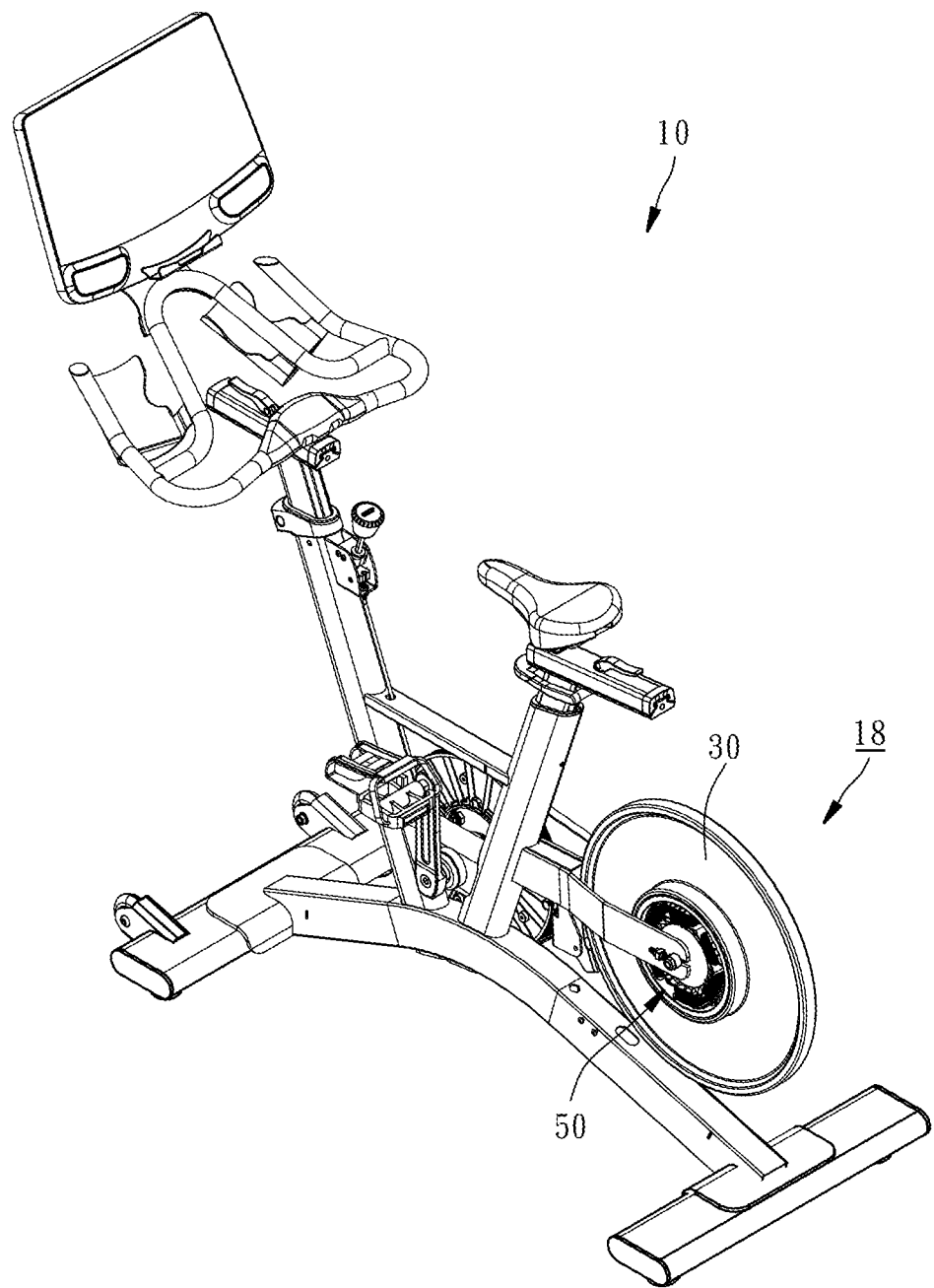
FIG. 1 is a perspective view of an internal magnetic resistance system for use with a body-building bike according to the present disclosure.

Direction-related terms used herein, including the embodiments and the claims, must be interpreted according to the accompanying drawings. Identical reference numerals used herein, including the embodiments and the accompanying drawings, denote identical or similar components or structural features thereof.

Figure 2:
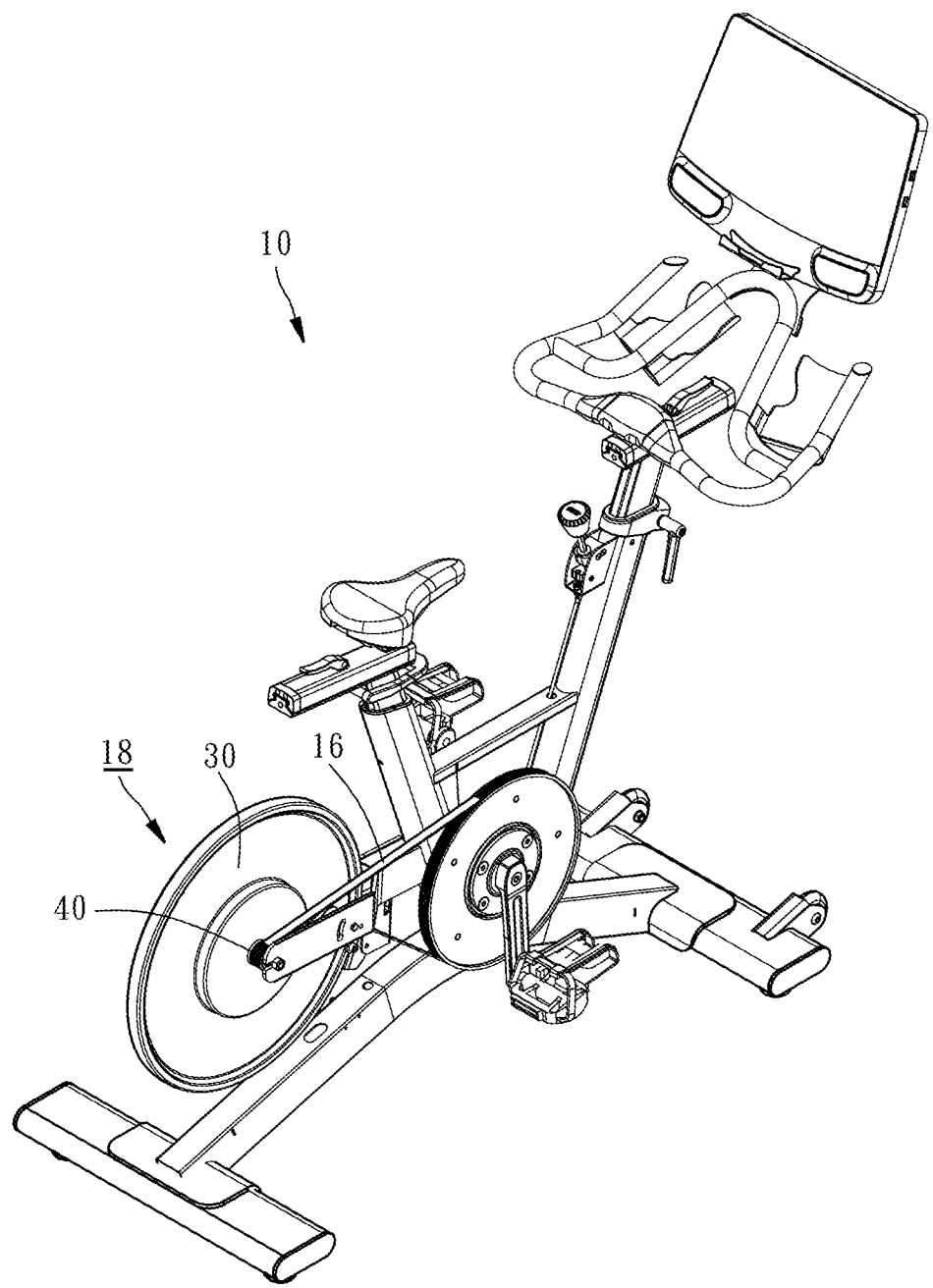
FIG. 2 is a perspective view of FIG. 1 from another angle.
Figure 3:
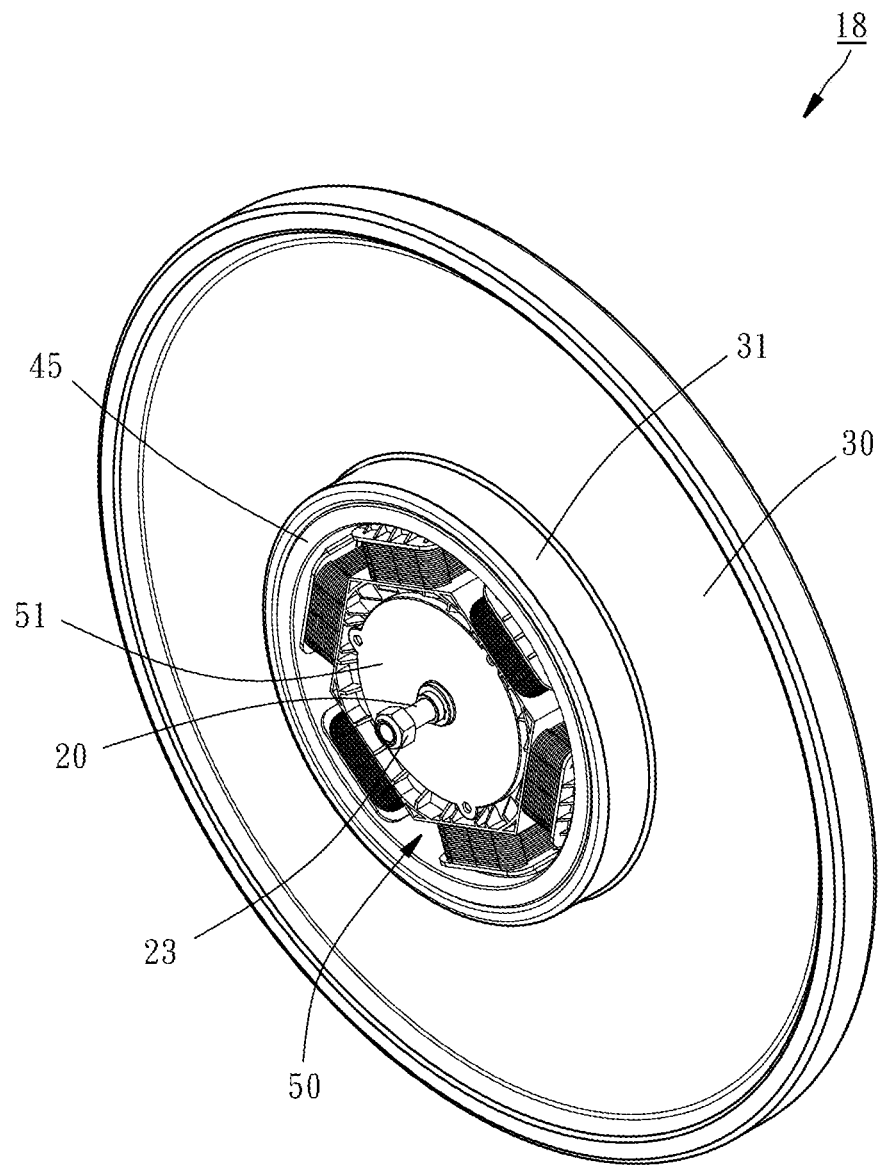
FIG. 3 is a perspective view of the internal magnetic resistance system of the present disclosure.
Figure 4:
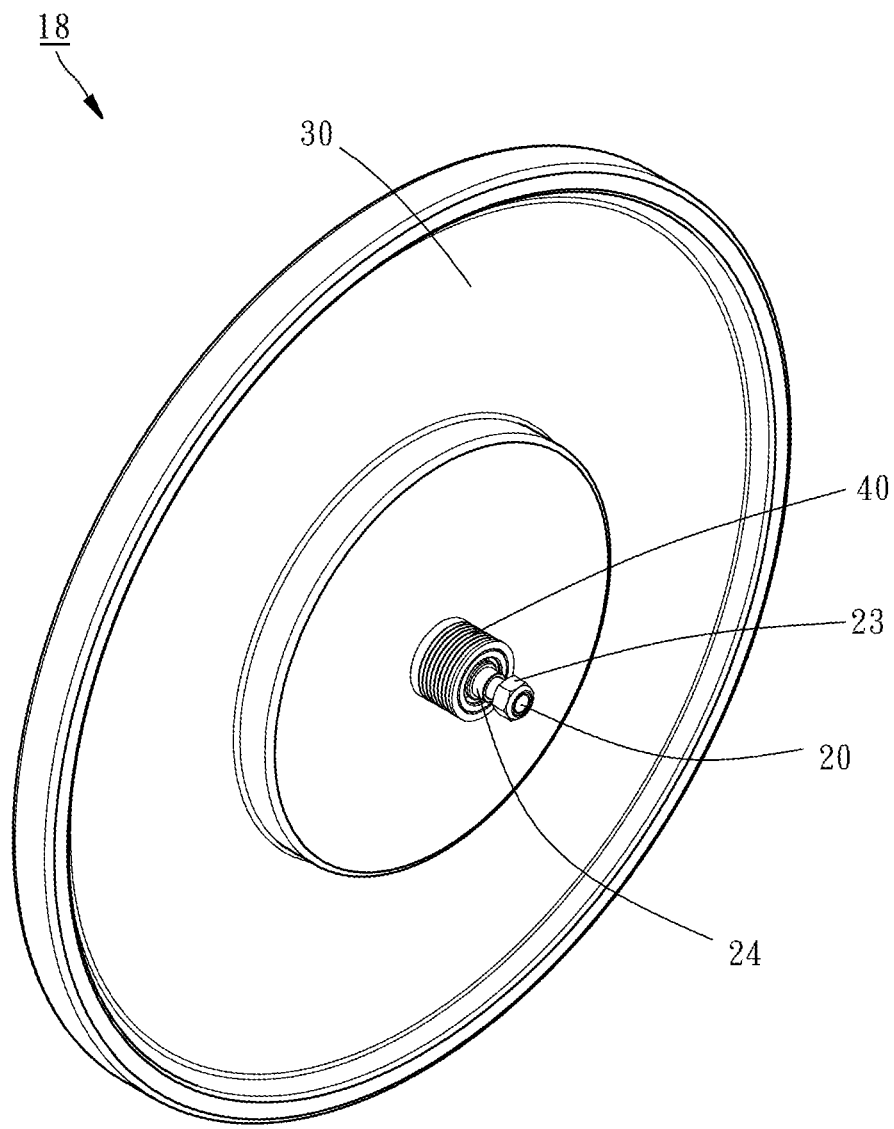
FIG. 4 is a perspective view of the internal magnetic resistance system of the present disclosure from another angle.
Figure 5:
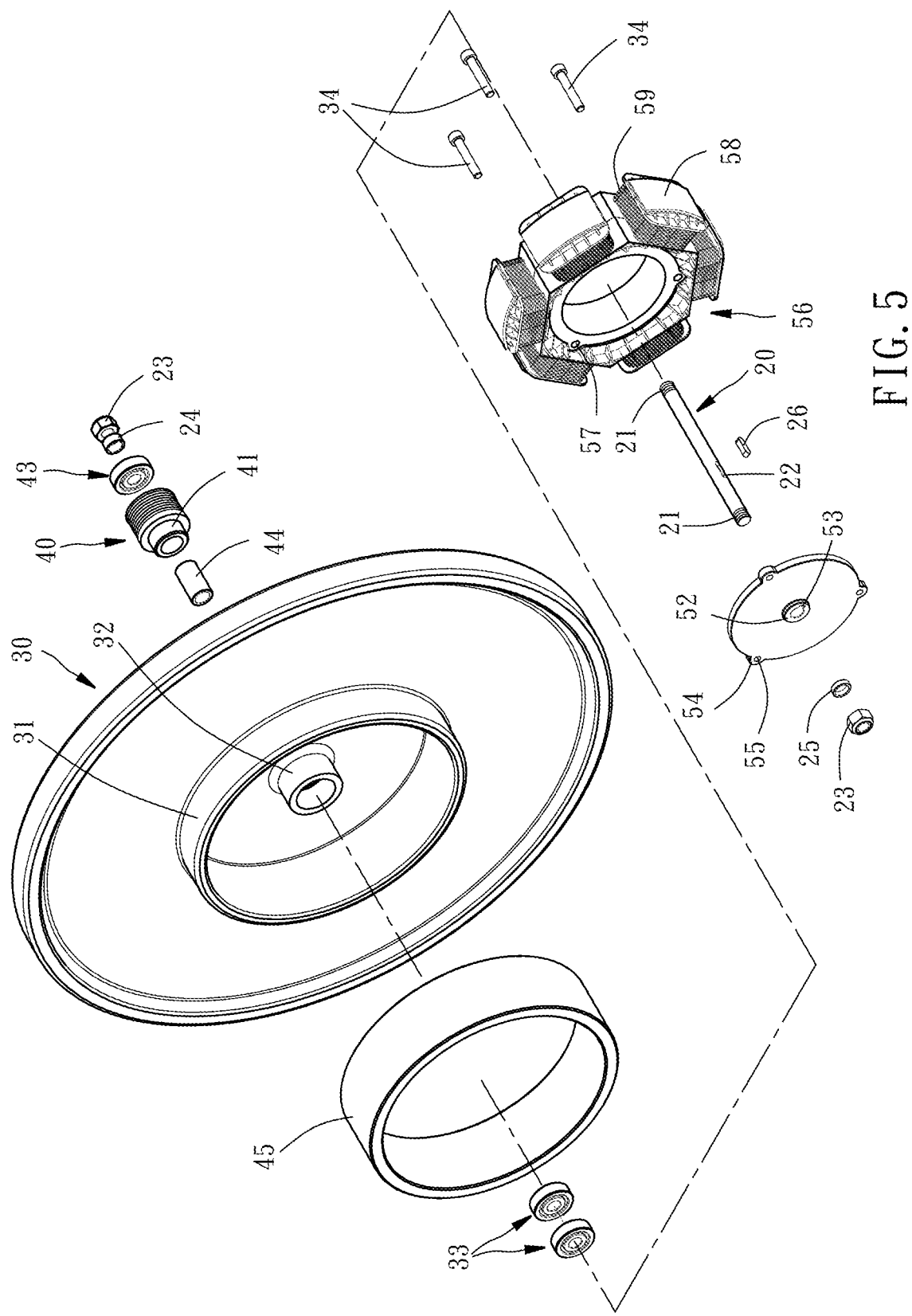
FIG. 5 is an exploded view of the internal magnetic resistance system of the present disclosure.

Referring to FIG. 1 and FIG. 2, FIG. 1 shows an upright body-building bike for use with a fitness device 10. Referring to FIG. 3 through FIG. 5, an internal magnetic resistance system 18 of the present disclosure comprises an axle 20, an inertia wheel 30, a transmission wheel 40, a magnetic permeable ring 45 and an electromagnet 50.

The left and right ends of the axle 20 each have a thread segment 21. A first keyway 22 is disposed at the axle 20 and located centrally but slightly toward the left.

Figure 6:
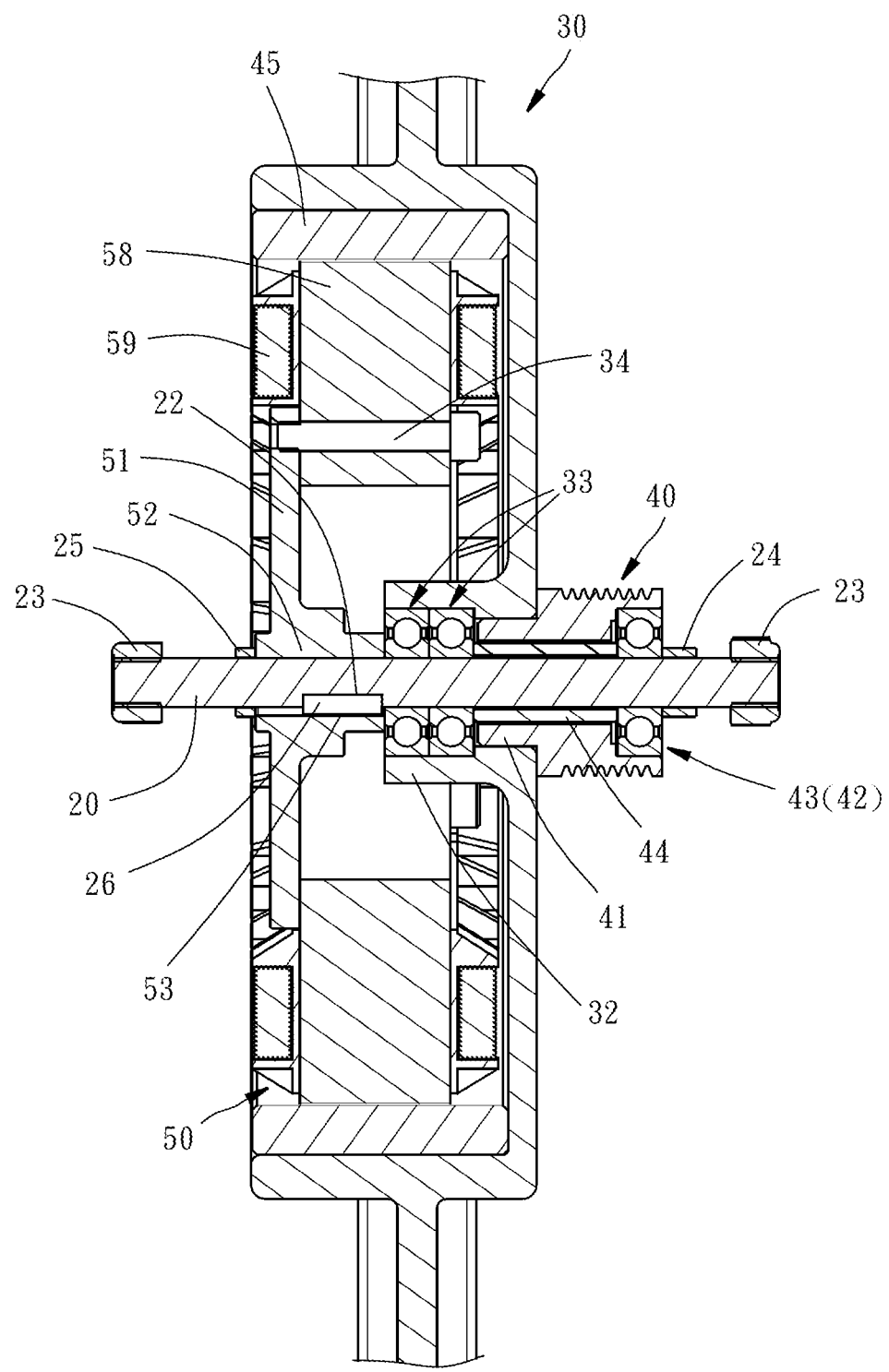
FIG. 6 is a cross-sectional view of the internal magnetic resistance system of the present disclosure.

The inertia wheel 30 is made of cast iron. The left lateral surface of the inertia wheel 30 has a protruding ring portion 31 and a first axial portion 32 disposed in the protruding ring portion 31. The first axial portion 32 has therein two first bearings 33 arranged side by side. Referring to FIG. 5 and FIG. 6, the inertia wheel 30 is mounted on the axle 20 by the two first bearing 33 such that the inertia wheel 30 rotates relative to the axle 20.

The left end of the transmission wheel 40 has a second axial portion 41 coaxially, penetratingly connected to the first axial portion 32 of the inertia wheel 30. The right end of the transmission wheel 40 has a bearing chamber 42 (shown in FIG. 6) which a second bearing 43 is disposed in, so as to keep the second bearing 43 structurally stable. The right end of the axle 20 has a right limiting ring 24. The right limiting ring 24 abuts against the outer end surface of the second bearing 43. The transmission wheel 40 is mounted on the axle 20 by the second bearing 43 and driven by a transmission component 16 (shown in FIG. 2), such as a belt or a chain, to rotate relative to the axle 20. Furthermore, a bushing 44 is disposed between the transmission wheel 40 and the axle 20. The bushing 44 augments smoothness and stability of the operation of the transmission wheel 40.

The magnetic permeable ring 45 is made of a magnetic permeable material, such as carbon steel. The magnetic permeable ring 45 is disposed in the protruding ring portion 31 of the inertia wheel 30. As shown in FIG. 5 and FIG. 6, the magnetic permeable ring 45 has an outer circumferential surface fixedly disposed on the inner circumferential surface of the protruding ring portion 31 such that the magnetic permeable ring 45 rotates together with the inertia wheel 30.

The electromagnet 50 is disposed in the protruding ring portion 31 of the inertia wheel 30 and surrounded by the magnetic permeable ring 45. The electromagnet 50 has a fixing board 51, a support 56, six iron cores 58 and six coils 59. As shown in FIG. 5 and FIG. 6, the fixing board 51 has a third axial portion 52 and a second keyway 53. The second keyway 53 is disposed on the inner circumferential surface of the third axial portion 52. The fixing board 51 is not only fitted to the axle 20 by the third axial portion 52 but also fixed to the axle 20 by a flat key 26. The flat key 26 is embeddedly disposed between the first keyway 22 of the axle 20 and the second keyway 53 of the fixing board 51. Furthermore, as shown in FIG. 5, the outer edge of the fixing board 51 further has three lugs 54. The lugs 54 are each penetrated by a screw hole 55. The support 56 is annular. The support 56 has three through-holes 57. Three bolts 34 are disposed at the three through-holes 57 of the support 56 and fastened to the three screw holes 55 of the fixing board 51 such that the support 56 and the fixing board 51 are fixed together. The iron cores 58 each comprise silicon steel plates stacked together. The six iron cores 58 are spaced apart, disposed at the outer edge of the support 56 and thus surrounded by the coils 59, respectively. Each said iron core 58 and the magnetic permeable ring 45 are separated by a gap G To maintain structural stability of the electromagnet 50, as shown in FIG. 5 and FIG. 6, a left limiting ring 25 is disposed at the left end of the axle 20 and abuts against the outer end surface of the third axial portion 52 of the fixing board 51.

Therefore, as soon as current is passed through the coils 59, magnetic field changes happen to the vicinity of all the iron cores 58. As a result, the magnetic permeable ring 45 is susceptible to magnetic hysteresis and thereby exerts a resistance force on the transmission wheel 40 through the inertia wheel 30, allowing the transmission component 16 to drive the transmission wheel 40 while allowing the user to attain the benefits of fitness training.

Figure 7:
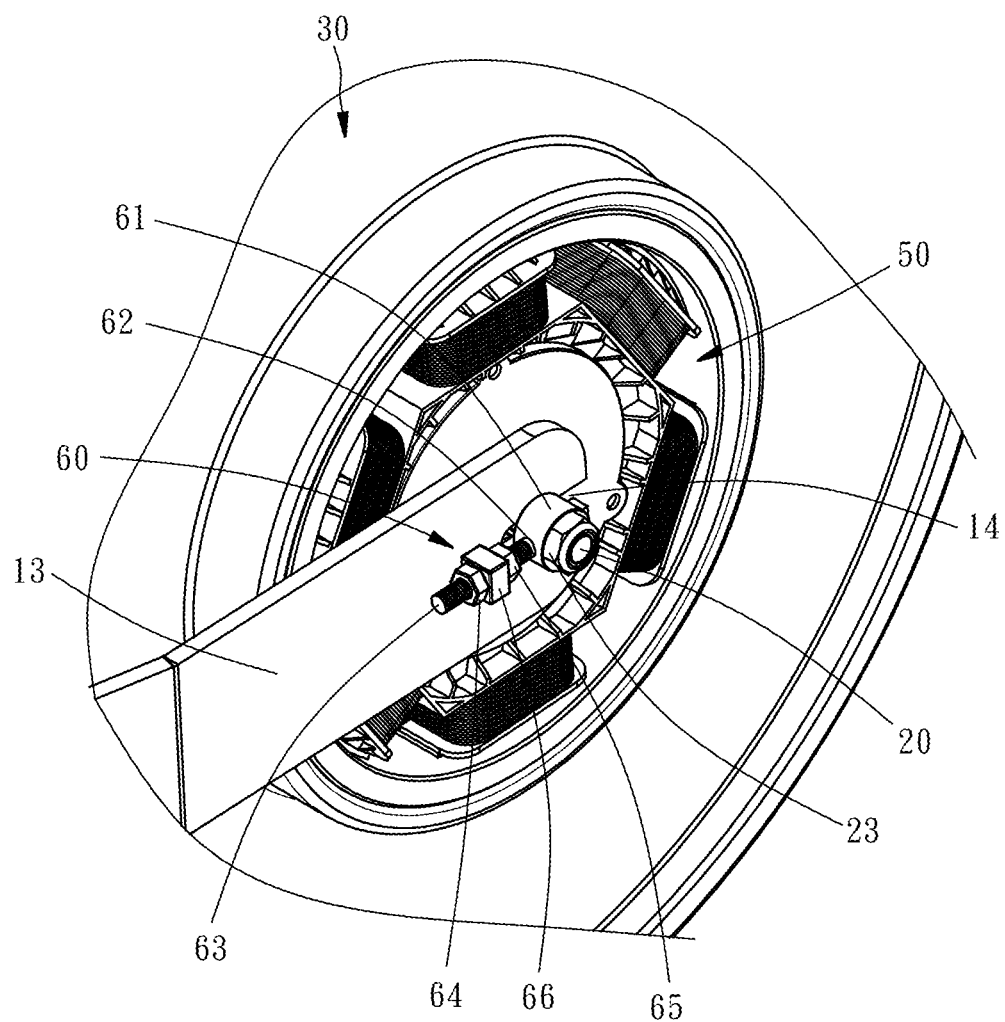
FIG. 7 is a partial enlarged view of FIG. 2.

When operating in conjunction with the fitness device 10 shown in FIG. 1, the left and right ends of the axle 20 are engagingly disposed in two rear fork slots 14, respectively. Then, two fixing nuts 23 are fastened to left and right thread segments 21 of the axle 20, respectively, to finalize the assembly process. To facilitate adjustment of front and rear positions of the system in its entirety, an adjustment component 60 shown in FIG. 7 is further provided. The adjustment component 60 has a sleeve 61, an adjustment screw 63, a first adjustment nut 64, a second adjustment nut 65 and a spacer 66. The sleeve 61 is fitted to the left end of the axle 20 and has a radial opening 62. The rear end of the adjustment screw 63 is disposed in the radial opening 62 of the sleeve 61. Both the first adjustment nut 64 and the second adjustment nut 65 are fastened to the adjustment screw 63 and face away from each other. The spacer 66 is fixed to a rear fork 13 by welding, penetrated by the adjustment screw 63, and disposed between the first adjustment nut 64 and the second adjustment nut 65. Hence, if the first adjustment nut 64 is rotated, the rear end of the adjustment screw 63 will push the axle 20, causing the internal magnetic resistance system 18 to move backward. If the second adjustment nut 65 is rotated, the adjustment screw 63 will move away from the axle 20, causing the internal magnetic resistance system 18 to move steadily forward or backward for the sake of position adjustment. Hence, not only is the position of the internal magnetic resistance system 18 mounted in place fine-tuned, but the internal magnetic resistance system 18 is stable and vibration-free in the course of its operation.

Figure 8:
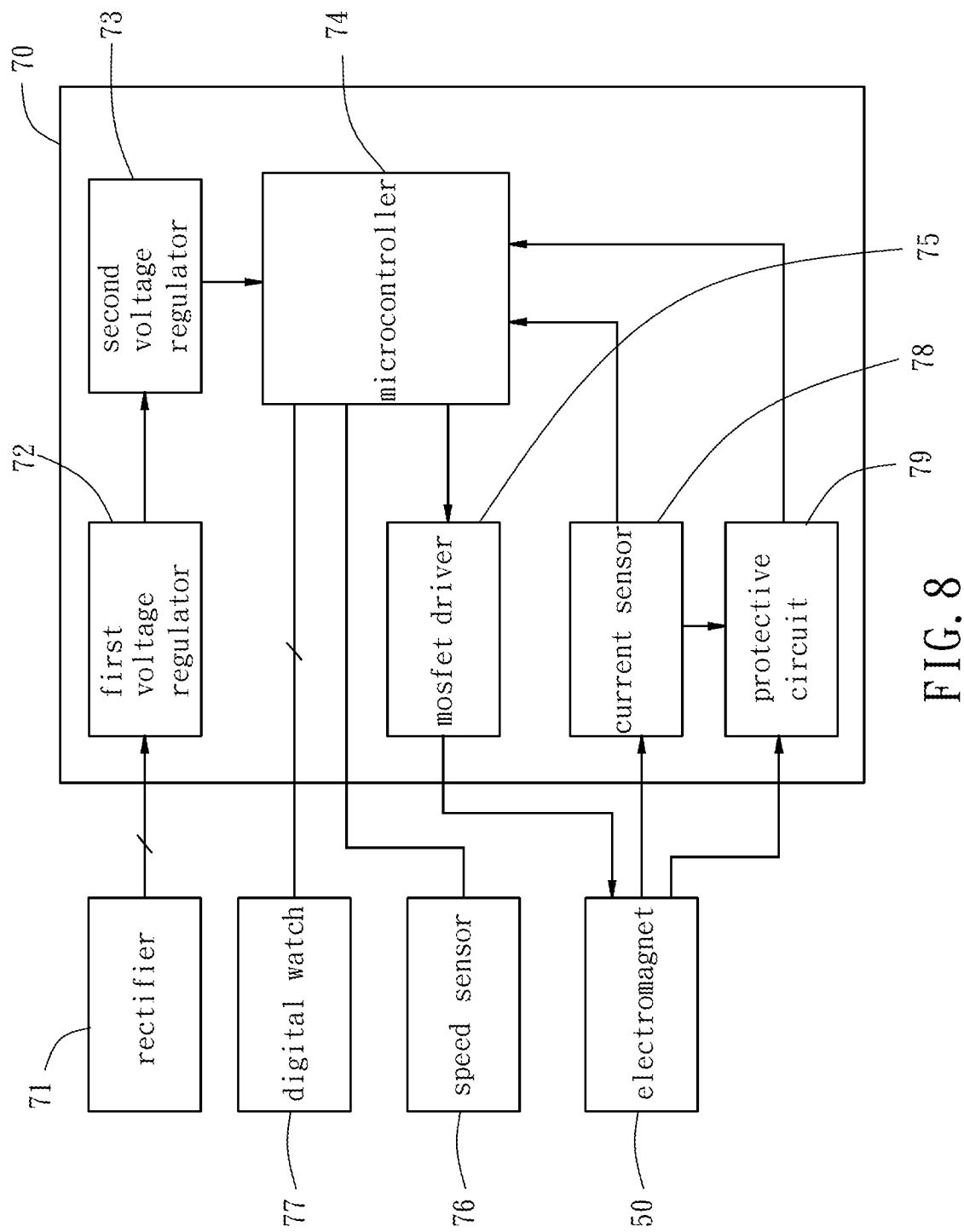
FIG. 8 is a block diagram of the internal magnetic resistance system operating in conjunction with an electrical control system according to the present disclosure.

Referring to FIG. 8, FIG. 8 is a block diagram of the internal magnetic resistance system 18 operating in conjunction with an electrical control system 70 according to the present disclosure. A rectifier 71 transfers current input by an electrical outlet to a first voltage regulator 72 to undergo first-instance constant voltage level maintenance and then to a second voltage regulator 73 to undergo second-instance constant voltage level maintenance. Upon completion of the two instances of constant voltage level maintenance, the current is transferred to a microcontroller 74. The microcontroller 74 not only uses a mosfet driver 75 to drive the electromagnet 50 but also receives the result of the rotation speed sensing performed by a speed sensor 76 on the inertia wheel 30. Next, the microcontroller 74 transmits the sensing result of the speed sensor 76 and the resistance strength of the electromagnet 50 to a digital watch 77 so as to be watched by the user. Furthermore, the microcontroller 74 uses a current sensor 78 to monitor the magnitude of the current passing through the electromagnet 50. The current sensor 78 and the electromagnet 50 are connected to the microcontroller 74 by a protective circuit 79 for overvoltage protection (OVP) or overcurrent protection (OCP) to ensure the operating safety of the circuit.

Figure 9:
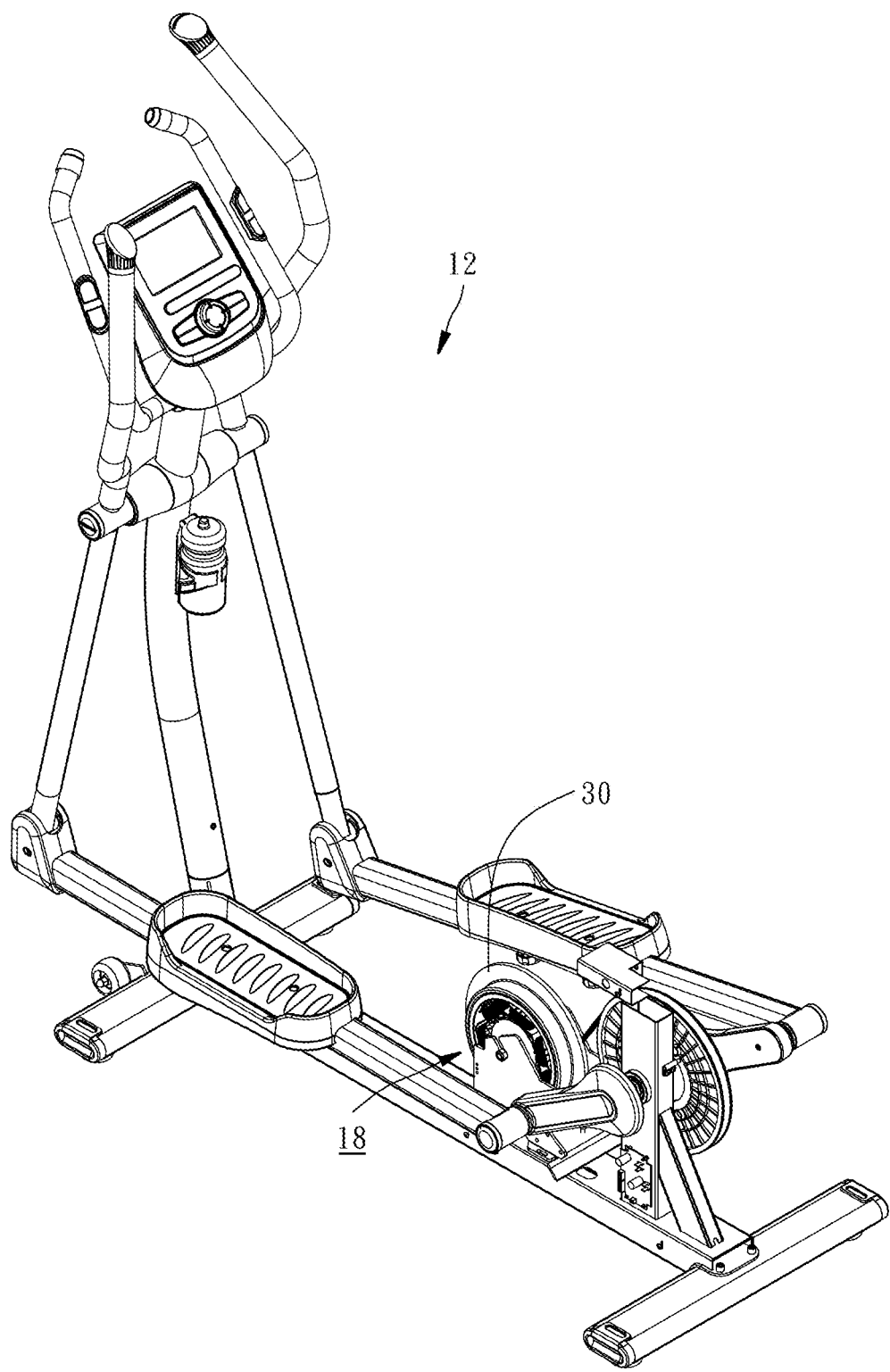
FIG. 9 is a perspective view of the internal magnetic resistance system for use with an elliptical trainer according to the present disclosure.

In conclusion, according to the present disclosure, the internal magnetic resistance system 18 enables the stable gap G to be maintained between the iron cores 58 and the magnetic permeable ring 45. The magnetic permeable ring 45 rotates together with the inertia wheel 30 and thereby divides the magnetic field generated around the iron cores 58; hence, magnitude of the current passing through the coils 59 varies and thus adjusts the strength of the magnetic field, allowing the electromagnet 50 to steadily exert different degrees of resistance forces on the inertia wheel 30. Furthermore, the internal magnetic resistance system 18 is not only applicable to the upright body-building bike 10 shown in FIG. 1 but also applicable to the elliptical trainer 12 shown in FIG. 9. In the case of the elliptical trainer, the inertia wheel 30 is designed to be lightweight and compact; by contrast, the structural features and operating principles of the other components, such as the axle 20, the transmission wheel 40, the magnetic permeable ring 45 and the electromagnet 50, remain unchanged and thus, for the sake of brevity, are not described herein as far as their application to the elliptical trainer 12 is concerned.

What is claimed is:

1. An internal magnetic resistance system for use with a fitness device, comprising:
   an axle;
   an inertia wheel rotatably disposed at the axle and having a lateral surface, the lateral surface having a protruding ring portion;
   a transmission wheel rotatably disposed at the axle and connected to another lateral surface of the inertia wheel, the another lateral surface facing away from the protruding ring portion;
   a magnetic permeable ring having an outer circumferential surface fixedly disposed on an inner circumferential surface of a protruding ring portion of the inertia wheel; and
   an electromagnet disposed in the protruding ring portion of the inertia wheel and surrounded by the magnetic permeable ring, wherein the electromagnet has a support, iron cores and coils, the support being fixedly disposed at the axle, the iron cores being disposed at the support, spaced apart relative to the axle, and separated from an inner circumferential surface of the magnetic permeable ring by a gap, and the coils winding around the iron cores, respectively.

2. The internal magnetic resistance system for use with a fitness device according to claim 1, wherein a lateral surface of the inertia wheel has a first axial portion disposed in the protruding ring portion, with a first bearing disposed between the first axial portion and the axle, wherein a second axial portion is disposed at an end of the transmission wheel and coaxially disposed in the first axial portion of the inertia wheel, wherein a bearing chamber is disposed at another end of the transmission wheel, and a second bearing is disposed in the bearing chamber and between the transmission wheel and the axle.

3. The internal magnetic resistance system for use with a fitness device according to claim 2, wherein a bushing is disposed between the transmission wheel and the axle.

4. The internal magnetic resistance system for use with a fitness device according to claim 3, wherein a right limiting ring is disposed at a right end of the axle and abuts against an outer end surface of the second bearing.

5. The internal magnetic resistance system for use with a fitness device according to claim 1, wherein the support is connected to a fixing board having a third axial portion such that the third axial portion and the axle are fixed together by a flat key.

6. The internal magnetic resistance system for use with a fitness device according to claim 5, wherein a left limiting ring is disposed at a left end of the axle and abuts against an outer end surface of the third axial portion of the fixing board.

7. The internal magnetic resistance system for use with a fitness device according to claim 1, further comprising an adjustment component having a sleeve, an adjustment screw, a first adjustment nut, a second adjustment nut and a spacer, the sleeve being fitted to a left end of the axle and having a radial opening, the adjustment screw being movably disposed at the spacer and having an end disposed in a radial through-hole of the sleeve, wherein both the first adjustment nut and the second adjustment nut are fastened to the adjustment screw and face away from each other, and the spacer is disposed between the first adjustment nut and the second adjustment nut.

* * * * *